United States Patent
Campbell et al.

(10) Patent No.: US 7,258,870 B2
(45) Date of Patent: Aug. 21, 2007

(54) POULTRY FEED SUPPLEMENT FOR INCREASING POULTRY-BASED MEAT WEIGHT

(75) Inventors: Joy M. Campbell, Ames, IA (US); Louis E. Russell, Johnston, IA (US); Barton S. Borg, Ames, IA (US); James D. Quigley, III, Ames, IA (US)

(73) Assignee: The Lauridsen Group Incorporated, Ankeny, IA (US)

(*) Notice: Subject to any disclaimer, the term of this patent is extended or adjusted under 35 U.S.C. 154(b) by 319 days.

(21) Appl. No.: 10/074,896

(22) Filed: Feb. 13, 2002

(65) Prior Publication Data

US 2003/0104034 A1 Jun. 5, 2003

Related U.S. Application Data

(60) Provisional application No. 60/268,772, filed on Feb. 14, 2001.

(51) Int. Cl.
*A23K 1/17* (2006.01)
*A23K 1/165* (2006.01)
*G01N 33/00* (2006.01)

(52) U.S. Cl. .......................................... 424/442; 800/3

(58) Field of Classification Search ............... 800/8, 800/288, 3; 424/442; 435/252.1
See application file for complete search history.

(56) References Cited

U.S. PATENT DOCUMENTS 5,268,357 A 12/1993 Yabiki et al.
6,004,576 A * 12/1999 Weaver et al. .............. 424/442
6,086,878 A 7/2000 Adalsteinsson et al.

OTHER PUBLICATIONS

Mullins, 1990, Nature, Fulminant hypertension in transgenic rats harbouring the mose Ren-2 gene, vol. 344, pp. 541-544.*
Hammer, 1990, Spontaneous inflammatory disease in transgenic rats expressing HLA-B27 and human beta-2m : An animal model of HLA-B27-associated human disorders, Cell, vol. 63, pp. 1099-1112.*
Mullins, 1989, Expression of the DBA/2J Ren-2 gene in the adrenal gland of transgenic mice, EMBO J. vol. 8, pp. 4065-4072.*
Taurog, 1988, HLA-B27 inbred and non-inbred transgenic mice, Jour. Immunol. vol. 141, pp. 4020-4023.*
Wall, 1996, Transgenic livestock:progress and prospects for the future, Theriogenology, vol. 45, pp. 57-68.*
Overbeek, 1994, "Factors affecting transgenic animal production," Transgenic animal technology, pp. 96-98.*

* cited by examiner

*Primary Examiner*—Valarie Bertoglio
(74) *Attorney, Agent, or Firm*—Schwegman, Lundberg, Woessner & Kluth P.A.

(57) ABSTRACT

The present invention relates to a method of increasing the live weight of poultry through the administration of a plasma product to the poultry through the animals' feed and/or water. The product is effective in increasing the live weight of poultry. The product is also surprisingly effective in increasing the yield of white meat to the detriment of dark meat.

7 Claims, No Drawings

POULTRY FEED SUPPLEMENT FOR INCREASING POULTRY-BASED MEAT WEIGHT

PRIORITY CLAIM

This application claims priority to U.S. Provisional Application Ser. No. 60/268,772 filed Feb. 14, 2001.

FIELD OF THE INVENTION

This invention relates to a composition and method for increasing the live weight of poultry. Specifically, this invention relates to the administration of serum or purified Ig components to poultry.

BACKGROUND OF THE INVENTION

While the Food Guide Pyramid promotes the consumption of meat in moderation, meat is still the base food in most families' diets. It is one of our best sources of iron and zinc, and is rich in protein, B vitamins, magnesium, and phosphorus. The Food Guide Pyramid promotes the consumption of no more than five to seven ounces of cooked meat per day. As important as the total amount of meat consumed, however, is the amount of fat that accompanies the meat selected.

Poultry is an excellent source of protein, and is much lower in fat than beef. While four ounces of lean beef contains 18 grams of fat, a four-ounce portion of skinless, turkey breast contains less than 2 grams fat. Even the fattier dark meat of duck has less than 13 grams fat per four-ounce portion when the skin is removed. Both chicken and turkey are main dish staples of which many people have increased their consumption due to their high-protein, low-fat nutritional value. Advances in processing technologies have further encouraged consumption of poultry products in producing new products such as hot dogs, cold cuts, and bacon made from these meats.

While poultry dark meat, i.e. thighs, legs, and wings, has been prized in many parts of the world, studies show that Americans generally prefer the white meat, i.e. breast meat. In this country, turkeys and chickens are bred to include a larger percentage of white meat. In addition to being preferred for taste, white meat has less fat and fewer calories than dark meat and skin. This holds true for all types of poultry that have both white and dark meat, including turkey, chicken and Cornish hens. Below are comparative charts of poultry products and their calories and fat profiles. All portion sizes are 3½ ounces, uncooked.

|  | Calories | Fat (grams) |
| --- | --- | --- |
| Turkey |  |  |
| Breast without skin | 135 | 1 |
| Breast with skin | 153 | 3 |
| Leg without skin | 159 | 4 |
| Leg with skin | 170 | 5 |
| Wing without skin | 163 | 3 |
| Wing with skin | 207 | 10 |
| Ground | 123 | 7 |
| Chicken |  |  |
| Breast without skin | 165 | 4 |
| Breast with skin | 197 | 8 |
| Leg without skin | 191 | 8 |
| Leg with skin | 232 | 13 |
| Wing without skin | 203 | 8 |

-continued

|  | Calories | Fat (grams) |
| --- | --- | --- |
| Wing with skin | 290 | 20 |
| Ground | 176 | 7 |
| Cornish Hens |  |  |
| White meat | 190 | 18 |
| Dark meat | 245 | 22 |

In several instances, even when the skin is left on the meat, the white meat tends to have the same or less fat and calories than the dark meat with the skin removed.

As shown, based on consumers' preference for white meat, and due to the nutritional and health benefits associated with white meat, it would be advantageous to determine a means for breeding and/or raising poultry to increase the average live weight. It would be even more advantageous to determine a means for breeding and/or raising poultry having a high white meat yield at the expense of dark meat yield.

Accordingly, it is a primary objective of the present invention to provide a composition and method for increasing the live weight of poultry using a product based on animal plasma.

It is a further objective of the present invention to provide a composition and method for increasing the white meat yield in poultry at the expense of the dark meat yield using a product based on animal plasma.

It is a further objective of the present invention to provide a composition and method for treating animals which increases growth and weight gain.

It is still a further objective of the present invention to provide a composition and method for increasing the live weight of poultry which is convenient and economical to administer.

It is still a further objective of the present invention to provide a composition and method for increasing the live weight of poultry which is easy and economical to manufacture.

The method and means of accomplishing each of the above objectives as well as others will become apparent from the detailed description of the invention which follows hereafter.

SUMMARY OF THE INVENTION

Applicants have discovered that serum, plasma, or portions purified therefrom preferably containing immunoglobulins, when administered to poultry provide an increase in live weight of the poultry. Quite surprisingly, the weight increase was seen preferentially in the breast meat yield at the expense of the leg and thigh yield.

Serum, plasma, or purified Ig components may be administered orally as supplement in water, in dry form as a feed supplement, or by any other method ad libitum. Also, cross species sources of plasma or purified Ig components were shown to be effective.

DETAILED DESCRIPTION OF THE PREFERRED EMBODIMENT

The present invention relates to a new method and composition for improving live weight in poultry through the administration of animal serum, plasma, or portions purified therefrom, preferably containing immunoglobulins. The present invention contemplates use with any poultry including, but not limited to, chickens, turkeys, ducks, geese, pheasants, and Cornish hens.

The present invention is predicated upon the discovery that the administration of plasma proteins to poultry, through the animals' water system, in dry feed, or otherwise, is effective in increasing the live weight of poultry. Plasma (serum) is composed of about 55-60% albumin, 25-30% globulin, 10% fibrinogen, and other proteins. As used herein, the term "plasma" includes the plasma portion of blood from natural animal sources or from recombinant means (the recombinant form being manufactured from transformed microorganisms or from transgenic animals or plants), as well as any fractions thereof, or any of the protein components which may be further purified therefrom, such fractions or components may include but are not limited to serum, albumin, globulins and the like. Purification of these components from plasma are methods known and commonly practiced by those of skill in the art.

The plasma protein product of the present invention can be administered to poultry during all stages of their life cycles to improve their health and nutrition, but is especially effective in newly hatched and young poultry to increase their weight. The consumption of plasma proteins improves the short-term enteric health of the animal which promotes feed and water intake. The provision of plasma proteins ensures the short-term protection of the poultry's enteric health.

In preparing the supplement of this invention, plasma proteins may be collected from recombinant transgenic and/or microorganism sources as noted above using methods well known to those skilled in the art, or from animal blood sources. When isolating the plasma proteins from animal blood, the blood is first collected, preferably at slaughter plants. The source of the blood can be from any animal that has blood containing plasma and plasma proteins. For convenience, slaughterhouse blood from beef, pork, and poultry sources are preferred sources of blood for use in this invention. In one embodiment, the blood may be held in a circulating stainless steel tank with anticoagulants such as sodium citrate or sodium phosphate to prevent clotting. Prevention of clotting is not essential to the invention as similar effects can be obtained with clot-removed serum or defibrinated plasma. Typically, the whole blood is then separated, preferably by centrifugation, although any other separation method may be used, into two parts, the cellular material (red corpuscles, white corpuscles, platelets, and other circulating precursor cells of the previous categories of cells) and plasma (or serum). After separation, the plasma may be cooled and stored in an insulated tank until ready to dry.

Plasma and/or the purified components of plasma, may then be further concentrated (for e.g. by membrane filtration). The concentrated product is next dried, preferably by spray-drying to form a beige powdery substance. Traditionally, a drier inlet temperature of approximately 190-230° C. and an outlet temperature from the drier of 82-95° C. will accomplish this objective. The resulting powdery substance will have a particle size of about 5-30 microns. This powder may then be compacted or compressed (around 1200-1400 psi), ground and optionally may be screened or otherwise separated by size to increase homogeneity. The resulting particle size is at least about 50 microns. Preferably, the size is greater than about 100 microns but less than about 2000 microns in diameter.

The dried plasma powder contemplated for use in this invention is comprised of high levels of amino acids. A typical amino acid assay of the powder by acid hydrolysis and subsequent column chromatography results in the following amino acid concentrations (in grams/100 grams of powder):

| Alanine | 4.2 |
|---|---|
| Arginine | 4.7 |
| Aspartic Acid | 7.9 |
| Cystine | 2.8 |
| Glutamic Acid | 11.7 |
| Glycine | 3.0 |
| Histidine | 2.8 |
| Isoleucine | 2.9 |
| Leucine | 7.8 |
| Lysine | 6.8 |
| Methionine | 0.7 |
| Phenylalanine | 4.6 |
| Proline | 4.5 |
| Serine | 4.7 |
| Threonine | 4.8 |
| Tryptophan | 1.4 |
| Tyrosine | 3.6 |
| Valine | 5.3 |

Chemical and other properties of dried plasma include about 60-80% protein, 9% moisture, 5-20% ash, 2% fat, 50.0 ppm iron, 0.15% calcium, 1.50% chloride, 1.7% phosphorous, 0.09% potassium, aqueous solubility 88%.

If intended for administration in water, the plasma product may be substantially purified and substantially free of fibrinogen. The term "substantially purified" refers to the fact that the plasma protein product contains insufficient amounts of other substances that will cause the product to clot or gel in water. Similarly, the term "substantially free" of fibrinogen refers to the fact that the plasma protein product contains insufficient amounts of fibrinogen to clot or gel in water.

Also, if intended for administration in water, the plasma protein product of this invention is preferably water stable. The term "water-stable" refers to the fact that the plasma protein product of this invention does not gel, precipitate, or clot. Instead, the water-stable product is a fluid with free-flowing solution characteristics.

The plasma is next preferably treated with an amount of calcium chloride compound sufficient to precipitate the fibrinogen fraction of the plasma and then removed preferably by centrifugation, although any other method of separation may be used. For convenience, the calcium chloride is preferably added to the plasma in a concentration of about 0.3-1% by weight of the plasma. Polyethylene glycol can also be used to precipitate the fibrinogen and albumin. The plasma component may then be further concentrated (e.g. by membrane filtration) and then dried.

The final plasma protein composition can also be spray-dried into a powder. The powder allows for easier packaging and remains stable for a longer period of time. The powder includes approximately 15-30% IgG. Other excipients may also be added to the plasma proteins such as fillers, acids, emulsifiers, dyes and the like and all are intended to be within the scope of the invention.

Spray-dried animal plasma is commercially available from several sources including APC Company, Inc. product sold under the mark of AP 920™, or Appetein™. AP 920 is a protein product comprised of albumin and globulin proteins. Specifically, AP 920 contains about 78.0% crude protein, about 0.3% crude fat, and about 0.5% crude fiber. The typical amino acid profile for AP 920 is as follows:

| | | | |
|---|---|---|---|
| Alanine | 4.2% | Lysine | 6.8% |
| Arginine | 4.7% | Methionine | 0.7% |
| Aspartic Acid | 7.9% | Phenylalanine | 4.6% |
| Cystine | 2.8% | Proline | 4.5% |
| Glutamic Acid | 11.7% | Serine | 4.7% |
| Glycine | 3.0% | Threonine | 4.8% |
| Histidine | 2.8% | Tryptophan | 1.4% |
| Isoleucine | 2.9% | Tyrosine | 3.6% |
| Leucine | 7.8% | Valine | 5.3% |

Another acceptable source of spray-dried plasma for use in this invention is Nutragammax™ 20, an immunoglobulin-rich bovine serum product manufactured by Proliant. Nutragammax 20 contains immunoglobulin G, albumin, α-2-macroglobulin, and transferrin, as well as significant concentrations of peptides such as insulin-like growth factor-1, fibroblast growth factor, and transforming growth factor-β. The amino acid breakdown of Nutragammax 20 is as follows (by % of total protein content):

| | | | |
|---|---|---|---|
| Lysine | 8.3% | Histidine | 2.3% |
| Threonine | 5.0% | Arginine | 4.4% |
| Tryptophan | 1.1% | Alanine | 4.3% |
| Methionine | 1.0% | Aspartic acid | 8.1% |
| Valine | 5.9% | Glycine | 2.2% |
| Isoleucine | 2.5% | Glutamic acid | 11.3% |
| Leucine | 8.8% | Proline | 4.5% |
| Phenylalanine | 4.8% | Serine | 4.8% |
| Cystine | 2.5% | Tyrosine | 4.7% |

The plasma protein composition is administered to the animal by placing it in the animal's feed or water system. If treated to remove the fibrinogen component, the plasma protein composition does not clot or gel in water and does not plug up the water lines. The plasma protein composition should be in the feed or water in a concentration from up to about 0.05-3% by weight of water, with up to about 0.1-1.5% by weight of water being preferred with up to 15% by weight of the animal's feed.

The plasma protein composition can be administered to the poultry at any stage of the animal's life. However, as a practical matter it will most frequently be administered in newly hatched or young poultry of one day of age to maturity to improve weight gain and growth.

When fed to poultry, it has been surprisingly found that in addition to increasing the overall weight of the poultry, the plasma protein composition of this invention preferentially increases the average yield of breast meat at the expense of leg and thigh meat yield. The average increase in yield of breast meat has been found to range between about 6-8%.

The following examples are offered to illustrate but not limit the invention. Thus, they are presented with the understanding that various formulation modifications as well as method of delivery modifications may be made and still be within the spirit of the invention.

EXAMPLE 1

Increase of Breast Meat Yield in Broilers

The objective of the study was to evaluate plasma proteins delivered via the water on performance and carcass characteristics in broilers.

Materials and Methods

Eighty-eight male one day old Jumbo Cornish X Rock broilers was randomly assigned to treatments. Initial body weight was 38 g. Treatments were applied in a 2×2 factorial design consisting of 1) vaccination or no vaccination and 2) serum treated water or untreated water. The broilers were housed as 10 or 11 broilers per pen utilizing a total of 8 pens. Body weight, feed intake and water intakes were measured daily. Broilers were offered a commercially available starter and grower diet consisting of 22% and 19% protein, respectively. Serum proteins were mixed with water daily to maintain freshness. The serum concentration in the treated water was altered weekly and consisted of 1.32% (week 1), 0.85% (week 2), 0.45% (week 3), 0.28% (week 4), 0.14% (week 5), and 0.28% (week 6), respectively for each week from d 0-42. The broilers were vaccinated on d 2, d 7, and d 14 with B1B1 New Castles/Bronchitis, IBD, and La Sota New Castles/Bronchitis, respectively. On d 42, a randomly selected group of 24 broilers representing 6 broilers per treatment were stunned, bled, defeathered, eviscerated, and partitioned to determine carcass characteristics of breast meat, wings, and thighs and legs. Liver and spleen were also weighed at the time of evisceration.

Data were analyzed as a factorial design using the GLM procedures of SAS (SAS/STAT Version 6.11 SAS Institute, Cary, N.C.). Model sum of squares consisted of vaccination and water treatment. Least squares means are reported.

Results

Performance data is presented in Table 1. No interactions between vaccination or water treatment were noted, thus, main effects are reported. Inclusion of plasma proteins in the water increased (P<0.001) average daily gain (ADG) during the first 3 weeks (D 0-7, 7-14, 14-21) with improvements (P <0.05) overall from d 0-42 compared to the birds offered untreated water. No differences (P>0.10) were observed due to vaccination. Average daily feed intake (ADFI) of birds offered serum containing water was increased (P<0.05) from d 0-7 compared to that of birds offered untreated water. No differences (P >0.10) were observed in ADFI during the remainder of the study due to water treatment or vaccination. Feed efficiency (G/F) was improved (P<0.05) from d 0-7, 7-14, and 0-14 in birds offered serum containing water compared to that of birds offered untreated water. No differences were observed in G/F during the remainder of the study from consumption of treated water or vaccination. Water intake was increased (P<0.05) on d 0-7, 7-14, and 0-14 in birds offered the treated water compared to that of birds offered untreated water. Vaccination or water treatments during the remainder of the study did not affect water intake (P>0.10).

Carcass characteristics are presented in Table 2. Live weight, cold carcass weight, and skinless breast meat yield were increased (P<0.05) in birds offered the serum containing water compared to that of the birds offered untreated water. Thigh and leg yield were decreased (P<0.01) in birds offered the serum treated water compared to that of the control birds. No differences (P>0.10) in spleen or liver weight were observed due to consumption of treated water. Vaccination increased (P<0.05) thigh and leg yield.

Discussion

The current study demonstrates improvements in poultry production and carcass parameters due to consumption of plasma proteins in the water. An increase (P<0.05) of 7.2% in live weight was observed when birds were offered serum containing water. The increase in body weight was a result of increased breast meat yield (6.9%) at the expense of thigh and leg yield. Thus, delivery of plasma proteins via the water increases performance in poultry resulting in increased breast meat yield.

TABLE 1

Main Effect of Water Treatment and Vaccination on Performance and Intake in Broilers

| ADG (g/d) | NV | Vac | SEM | P | | Water | Serum | SEM | P |
|---|---|---|---|---|---|---|---|---|---|
| D 0–7 | 17.47 | 17.66 | 0.28 | 0.6310 | D 0–7 | 15.25 | 19.89 | 0.28 | 0.0001 |
| D 7–14 | 41.46 | 42.32 | 0.66 | 0.3600 | D 7–14 | 39.17 | 44.61 | 0.66 | 0.0001 |
| D 14–21 | 64.00 | 62.99 | 0.97 | 0.4542 | D 14–21 | 61.23 | 65.76 | 0.95 | 0.0011 |
| D 21–28 | 77.13 | 76.65 | 1.37 | 0.8025 | D 21–28 | 76.00 | 77.78 | 1.33 | 0.3431 |
| D 28–35 | 89.74 | 93.49 | 1.70 | 0.1135 | D 28–35 | 93.06 | 90.17 | 1.68 | 0.2179 |
| D 35–42 | 81.35 | 83.33 | 2.61 | 0.5824 | D 35–42 | 79.37 | 85.30 | 2.57 | 0.1009 |
| D 0–14 | 29.41 | 29.97 | 0.43 | 0.3530 | D 0–14 | 27.20 | 32.19 | 0.42 | 0.0001 |
| D 0–21 | 40.85 | 40.95 | 0.55 | 0.8904 | D 0–21 | 38.50 | 43.30 | 0.54 | 0.0001 |
| D 0–28 | 49.92 | 49.88 | 0.68 | 0.9673 | D 0–28 | 47.88 | 51.92 | 0.67 | 0.0001 |
| D 0–35 | 57.95 | 58.76 | 0.78 | 0.4548 | D 0–35 | 57.00 | 59.71 | 0.77 | 0.0133 |
| D 0–42 | 61.85 | 62.85 | 0.91 | 0.4281 | D 0–42 | 60.73 | 63.97 | 0.90 | 0.0115 |
| D 0–7 | 17.73 | 19.01 | 0.60 | 0.2043 | D 0–7 | 17.19 | 19.55 | 0.60 | 0.0494 |
| D 7–14 | 55.08 | 56.89 | 0.90 | 0.2245 | D 7–14 | 54.65 | 57.32 | 0.90 | 0.1033 |
| D 14–21 | 103.53 | 103.76 | 2.39 | 0.9474 | D 14–21 | 100.40 | 106.89 | 2.39 | 0.1276 |
| D 21–28 | 166.08 | 158.11 | 3.34 | 0.1667 | D 21–28 | 161.22 | 162.96 | 3.34 | 0.7319 |
| D 28–35 | 173.17 | 177.00 | 2.70 | 0.3728 | D 28–35 | 177.96 | 172.22 | 2.70 | 0.2075 |
| D 35–42 | 173.56 | 168.42 | 3.20 | 0.3199 | D 35–42 | 168.76 | 173.22 | 3.20 | 0.3806 |
| D 0–14 | 36.04 | 37.95 | 0.72 | 0.1354 | D 0–14 | 35.80 | 38.20 | 0.72 | 0.0785 |
| D 0–21 | 57.55 | 59.89 | 1.31 | 0.2752 | D 0–21 | 57.04 | 60.40 | 1.31 | 0.1433 |
| D 0–28 | 83.04 | 84.44 | 1.99 | 0.6430 | D 0–28 | 82.35 | 85.13 | 1.99 | 0.3788 |
| D 0–35 | 99.89 | 102.75 | 2.04 | 0.3782 | D 0–35 | 100.95 | 101.69 | 2.04 | 0.8100 |
| D 0–42 | 111.12 | 113.45 | 2.04 | 0.4634 | D 0–42 | 111.80 | 112.77 | 2.04 | 0.7550 |
| Feed Efficiency gain/feed | | | | | | | | | |
| D 0–7 | 0.97 | 0.93 | 0.02 | 0.1141 | D 0–7 | 0.89 | 1.01 | 0.02 | 0.0043 |
| D 7–14 | 0.73 | 0.75 | 0.01 | 0.3142 | D 7–14 | 0.71 | 0.77 | 0.01 | 0.0106 |
| D 14–21 | 0.61 | 0.61 | 0.01 | 0.9359 | D 14–21 | 0.61 | 0.61 | 0.01 | 0.8024 |
| D 21–28 | 0.46 | 0.48 | 0.01 | 0.1825 | D 21–28 | 0.47 | 0.48 | 0.01 | 0.5352 |
| D 28–35 | 0.51 | 0.52 | 0.01 | 0.5848 | D 28–35 | 0.52 | 0.51 | 0.01 | 0.3970 |
| D 35–42 | 0.47 | 0.49 | 0.01 | 0.3560 | D 35–42 | 0.47 | 0.48 | 0.01 | 0.5258 |
| D 0–14 | 0.79 | 0.79 | 0.01 | 0.9538 | D 0–14 | 0.75 | 0.83 | 0.01 | 0.0022 |
| D 0–21 | 0.69 | 0.69 | 0.01 | 0.8766 | D 0–21 | 0.67 | 0.71 | 0.01 | 0.0521 |
| D 0–28 | 0.58 | 0.59 | 0.01 | 0.5560 | D 0–28 | 0.57 | 0.60 | 0.01 | 0.1202 |
| D 0–35 | 0.56 | 0.57 | 0.01 | 0.5023 | D 0–35 | 0.56 | 0.57 | 0.01 | 0.1910 |
| D 0–42 | 0.54 | 0.55 | 0.01 | 0.2606 | D 0–42 | 0.53 | 0.55 | 0.01 | 0.1106 |
| Water Intake (mL/d) | | | | | | | | | |
| D 0–7 | 50.82 | 53.06 | 2.00 | 0.4711 | D 0–7 | 46.62 | 57.26 | 2.00 | 0.0197 |
| D 7–14 | 116.67 | 121.88 | 2.27 | 0.1795 | D 7–14 | 112.85 | 125.70 | 2.27 | 0.0160 |
| D 14–21 | 189.20 | 196.78 | 4.57 | 0.3058 | D 14–21 | 187.34 | 198.65 | 4.57 | 0.1549 |
| D 21–28 | 283.02 | 296.18 | 9.24 | 0.3709 | D 21–28 | 286.20 | 293.00 | 9.24 | 0.6302 |
| D 28–35 | 389.12 | 365.19 | 21.75 | 0.5179 | D 28–35 | 368.66 | 385.65 | 21.75 | 0.6363 |
| D 35–42 | 442.74 | 409.34 | 18.69 | 0.2603 | D 35–42 | 407.42 | 444.66 | 18.69 | 0.2204 |
| D 0–14 | 83.11 | 87.47 | 2.02 | 0.2017 | D 0–14 | 79.52 | 91.07 | 2.02 | 0.0155 |
| D 0–21 | 116.94 | 123.91 | 2.76 | 0.1489 | D 0–21 | 114.96 | 125.89 | 2.76 | 0.0490 |
| D 0–28 | 155.86 | 166.98 | 3.30 | 0.0759 | D 0–28 | 156.48 | 166.35 | 3.30 | 0.1021 |
| D 0–35 | 203.74 | 206.42 | 4.09 | 0.6887 | D 0–35 | 197.86 | 212.30 | 4.09 | 0.1302 |
| D 0–42 | 241.45 | 239.50 | 6.85 | 0.8587 | D 0–42 | 231.33 | 249.62 | 6.85 | 0.1995 |

ADG = average daily gain  
NV = not vaccinated  
Vac = vaccinated  
SEM = standard error of mean  
P = P value

TABLE 2

Main Effect of Water Treatment and Vaccination on Carcass Characteristics in Broilers

| | NV | Vac | SEM | P | Water | Serum | SEM | P |
|---|---|---|---|---|---|---|---|---|
| Live Weight, g | 2715.58 | 2702.25 | 52.62 | 0.8596 | 2614.5 | 2803.33 | 52.62 | 0.0196 |
| Cold Carcass Weight, g | 1934.06 | 1917.18 | 40.04 | 0.7687 | 1838.76 | 2012.48 | 40.04 | 0.0061 |
| Skinless Breast Meat, g/kg BW | 269.02 | 264.51 | 3.75 | 0.4053 | 257.87 | 275.66 | 3.75 | 0.0032 |
| Thigh and leg, g/kg BW | 305.85 | 313.9 | 2.66 | 0.0452 | 315.78 | 303.97 | 2.66 | 0.0052 |

TABLE 2-continued

Main Effect of Water Treatment and Vaccination on Carcass Characteristics in Broilers

|  | NV | Vac | SEM | P | Water | Serum | SEM | P |
| --- | --- | --- | --- | --- | --- | --- | --- | --- |
| Wings, g/kg BW | 108.39 | 108.37 | 1.64 | 0.9943 | 110.31 | 106.45 | 1.64 | 0.1115 |
| Spleen, g/kg BW | 1.09 | 1.32 | 0.09 | 0.0849 | 1.17 | 1.24 | 0.09 | 0.6088 |
| Liver, g/kg BW | 24.82 | 24.93 | 0.78 | 0.9236 | 24.76 | 25 | 0.78 | 0.8322 | cold carcass body weight = BW

It should be appreciated that minor dosage and formulation modifications of the composition and the ranges expressed herein may be made and still come within the scope and spirit of the present invention.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. A method of increasing the yield of breast meat and decreasing the yield of thigh and leg meat from poultry comprising: administering to poultry spray-dried animal serum, wherein the serum is administered in the water supply of said poultry at a concentration of about 0.05-3.0% by weight of the poultry's water supply, so as to increase the yield of breast meat from the poultry, while decreasing the yield of thigh and leg meat from said poultry.

2. A method according to claim 1 whereby the serum is administered at a concentration of about 0.1-1.5% by weight of the poultry's water supply.

3. A method according to claim 1 wherein the source of the animal serum is a livestock animal.

4. A method according to claim 1 wherein the source of the animal serum is poultry, porcine or bovine blood.

5. A method according to claim 1 whereby the poultry is selected from the group consisting of chickens, turkeys, Cornish hens, pheasants, ducks, and geese.

6. A method according to claim 1 wherein the serum is administered to the poultry from day one of life to maturity.

7. A method according to claim 1 wherein the administration of the serum increases the yield of breast meat by about 6-8% by weight.

* * * * *